(12) United States Patent
Washio et al.

(10) Patent No.: US 9,205,736 B2
(45) Date of Patent: Dec. 8, 2015

(54) FUELING-ERROR PREVENTION DEVICE

(75) Inventors: Yosuke Washio, Hiroshima (JP);
Hiroyuki Yoshii, Hiroshima (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 497 days.

(21) Appl. No.: 13/510,456

(22) PCT Filed: Nov. 17, 2010

(86) PCT No.: PCT/JP2010/070494
§ 371 (c)(1),
(2), (4) Date: Jul. 20, 2012

(87) PCT Pub. No.: WO2011/062193
PCT Pub. Date: May 26, 2011

(65) Prior Publication Data
US 2012/0279612 A1    Nov. 8, 2012

(30) Foreign Application Priority Data

Nov. 18, 2009  (JP) ................................. 2009-263189

(51) Int. Cl.
*B60K 15/04*    (2006.01)
(52) U.S. Cl.
CPC ......... *B60K 15/04* (2013.01); *B60K 2015/0483* (2013.01)
(58) Field of Classification Search
CPC .. B60K 15/04; B60K 2015/0483; B65B 3/04; B65B 1/04
USPC .................................. 141/348–350; 220/86.2
See application file for complete search history.

(56) References Cited

U.S. PATENT DOCUMENTS

| | | | | |
|---|---|---|---|---|
| 6,968,874 B1 * | 11/2005 | Gabbey et al. | ................ | 141/349 |
| 7,293,586 B2 * | 11/2007 | Groom et al. | ................ | 141/350 |
| 7,302,977 B2 * | 12/2007 | King et al. | .................... | 141/367 |
| 7,661,550 B2 * | 2/2010 | Feichtinger | .................. | 220/86.2 |
| 7,665,493 B2 * | 2/2010 | Groom et al. | ................ | 141/350 |
| 7,789,113 B2 * | 9/2010 | Stephan et al. | ............... | 141/350 |
| 7,967,041 B2 * | 6/2011 | Groom et al. | ................ | 141/367 |

(Continued)

FOREIGN PATENT DOCUMENTS

| | | |
|---|---|---|
| DE | 20 2007 010 406 U1 | 12/2008 |
| DE | 20 2008 011 199 U1 | 10/2009 |

(Continued)

OTHER PUBLICATIONS

European Patent Office, "Extended European Search Report for EP 10 83 1587", May 27, 2013.

*Primary Examiner* — Timothy L Maust
*Assistant Examiner* — Andrew StClair
(74) *Attorney, Agent, or Firm* — Manabu Kanesaka

(57) ABSTRACT

A fueling-error prevention device is provided in an inside of a fuel flow path between a fueling opening and a fuel tank. A flap valve is provided on one of the first and the second sliders which are disposed opposite each other with the fuel flow path positioned therebetween. Accompanied by an insertion of a fueling nozzle having a predetermined diameter, the fueling nozzle abuts against either the first or the second slider so as to move one slider in a separating direction. Thus, the other of the first or the second slider is allowed to move in the separating direction, and due to the movement of the other slider in the separating direction by abutment of the fueling nozzle, the flap valve is allowed to be opened.

4 Claims, 15 Drawing Sheets

(56) References Cited

U.S. PATENT DOCUMENTS

| | | | |
|---|---|---|---|
| 7,967,042 B2 * | 6/2011 | Groom et al. | 141/367 |
| 8,807,369 B2 * | 8/2014 | Sasaki | 220/86.2 |
| 2002/0020465 A1 * | 2/2002 | Gzik | 141/390 |
| 2006/0032552 A1 * | 2/2006 | Hedevang | 141/367 |
| 2007/0034287 A1 * | 2/2007 | Groom et al. | 141/350 |
| 2008/0041492 A1 * | 2/2008 | Gabbey et al. | 141/350 |
| 2008/0092986 A1 | 4/2008 | Buchgraber | |
| 2008/0237231 A1 * | 10/2008 | Feichtinger | 220/86.2 |
| 2009/0020182 A1 * | 1/2009 | Groom et al. | 141/349 |
| 2010/0006178 A1 * | 1/2010 | Muth et al. | 141/350 |
| 2010/0218849 A1 * | 9/2010 | Hagano | 141/350 |
| 2012/0285579 A1 * | 11/2012 | Dudley et al. | 141/1 |
| 2013/0233445 A1 * | 9/2013 | Pfohl | 141/350 |
| 2013/0340866 A1 * | 12/2013 | Sasaki | 137/561 R |
| 2014/0209203 A1 * | 7/2014 | Dudley et al. | 141/1 |

FOREIGN PATENT DOCUMENTS

| | | |
|---|---|---|
| GB | 2 431 634 A | 5/2007 |
| GB | 2431634 A * | 5/2007 |

* cited by examiner

FUELING-ERROR PREVENTION DEVICE

FIELD OF TECHNOLOGY

The present invention relates to an improvement of a fueling-error prevention device which is provided in an inside of a fuel flow path between a fueling opening and a fuel tank; blocks the fueling by a fueling nozzle when the fueling nozzle having a diameter less than a predetermined diameter is inserted in the fuel flow path; and allows the fueling by the fueling nozzle when the fueling nozzle having the predetermined diameter is inserted in the fuel flow path.

BACKGROUND ART

There is a device shown in Patent Document 1, which prevents the fueling of non-predetermined types of fuels by the fueling nozzle which does not reach the predetermined diameter, i.e., a fueling error, with a mechanical structure. In such device, a flap which becomes a valve body is rotatably attached to one of a pair of reception means which can be pressed apart outwardly, and in a state before a pair of the reception means is pressed apart, a free end of the flap is engaged with the other of a pair of the reception means so as to block a rotation of the flap in a valve-opened position. Then, in such device, when a fueling nozzle, having a thickness allowing a pair of the reception means to be separated for a size releasing the aforementioned engagement, i.e., a thickness allowing a pair of the reception means to be pressed apart, is inserted, the rotation of the flap in the valve-opened position is allowed. Hence, even when only one of a pair of the reception means is moved outward by the inserted fueling nozzle, such device has a structure allowing the aforementioned engagement to be released.

PRIOR ART DOCUMENT

Patent Document

Patent Document 1: Japanese Unexamined Patent Publication No. 2009-502611

SUMMARY OF THE INVENTION

Problems to be Solved by the Invention

The main feature to be solved by the present invention is to provide a device which can reliably prevent the fueling error with the mechanical structure.

Means for Solving the Problems

In order to achieve the aforementioned problem, in the present invention, from the first aspect, a fueling-error prevention device is provided inside of a fuel flow path between a fueling opening and a fuel tank. The fueling-error prevention device comprises a flap valve provided on one of the first or the second sliders which are disposed opposite each other with the fuel flow path positioned therebetween. Accompanied by an insertion of a fueling nozzle having a predetermined diameter, the fueling nozzle abuts against one of both sliders, so that one slider moves in a separating direction so as to allow the other of both sliders to move in the separating direction. Accordingly, due to the movement of the other slider in the separating direction by the abutment of the fueling nozzle, the flap valve is allowed to be opened.

Also, in order to achieve the aforementioned problem, in the present invention, from a second aspect, the fueling-error prevention device is provided inside of the fuel flow path between the fueling opening and the fuel tank. The fueling-error prevention device comprises the flap valve positioned in a valve-closed position blocking the fuel flow path by urging to block the fueling nozzle from proceeding; the first slider supporting the flap valve openably and closably, and also supported slidably and movably in a direction crossing an axis line of the fuel flow path; the second slider comprising an engaging portion relative to the flap valve which is in the valve-closed position, and also supported slidably and movably in the direction crossing the axis line of the fuel flow path; an urging device urging the first slider and the second slider in an approaching direction; and a lock member blocking one of either the first slider or the second slider from moving in the separating direction against the urging of the urging device. The blocking of the movement by the lock member is released by the movement of the other of the first slider or the second slider which moves against the urging of the urging device by the abutment of the fueling nozzle having the predetermined diameter accompanied by the insertion of the fueling nozzle having the predetermined diameter. The aforementioned release allows one of the first slider or the second slider to move against the urging of the urging device due to the abutment of the fueling nozzle. Due to the movement of one slider, an engagement of the second slider relative to the flap valve is released.

In that case, furthermore, one of preferable aspects is that the lock member is supported slidably and movably between a lock position blocking one of either the first slider or the second slider from moving in the separating direction, and a non-lock position, and also that the lock member is recoiled and urged toward the lock position. Also, in that case, furthermore, it is preferable that such lock member includes an abutting portion relative to a back portion of one of either the first slider or the second slider, and moves up to the non-lock position in a direction along the axis line of the fuel flow path against the urging to release the abutment of the abutting portion relative to the back portion.

A movement to a valve-opened position of the flap valve closing the fuel flow path openably is allowed for the first time by the movement of one of the first or the second sliders which becomes movable as a trigger of the movement of the other of the first or the second sliders. Accordingly, in addition to the movement of the other of the first or the second sliders, as long as a fueling nozzle having a thickness allowing one of the first or the second sliders to move for a predetermined distance, i.e., the fueling nozzle having the predetermined diameter is not inserted into the fuel flow path, the flap valve never moves to the valve-opened position. For example, even if the fueling nozzle which does not reach the predetermined diameter is inserted into the fuel flow path, and is operated to sway inside the fuel flow path, only the other of the first or the second sliders moves, and the flap valve is never opened.

Effect of the Invention

According to the present invention, the fueling of the non-predetermined types of fuels by the fueling nozzle which does not reach the predetermined diameter, i.e., the fueling error, can be reliably prevented.

BEST MODES OF CARRYING OUT THE INVENTION

Figure 1:
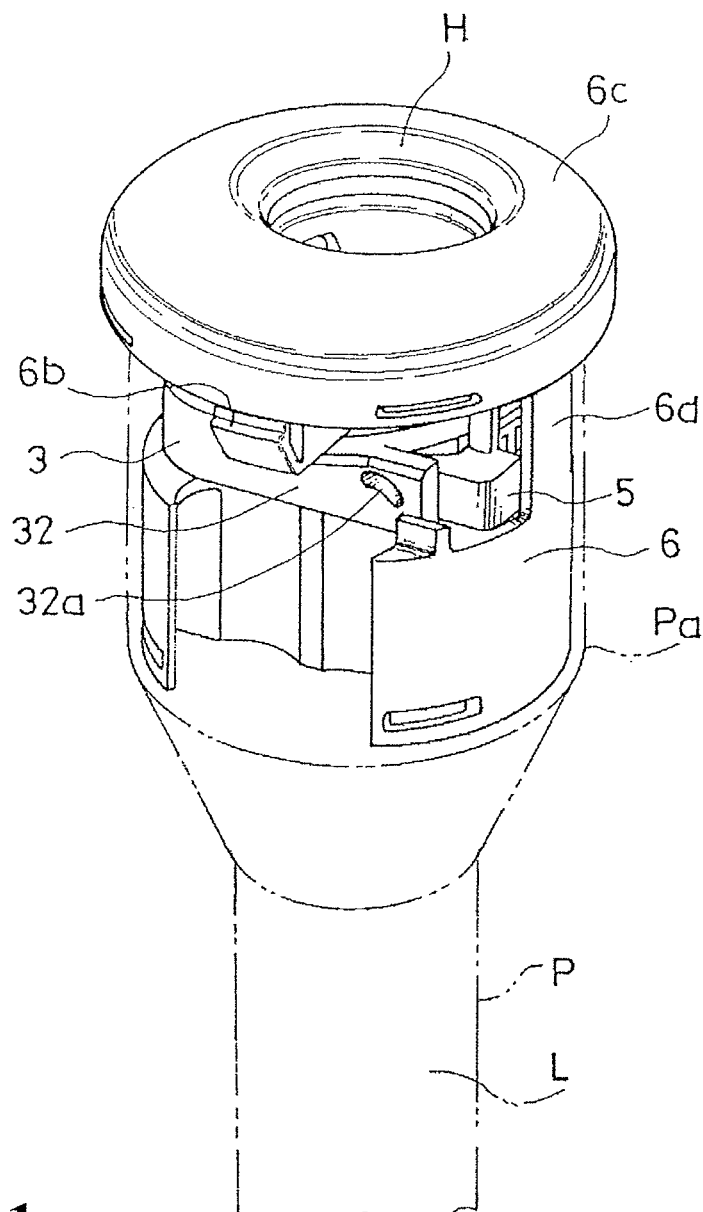
FIG. 1 is a perspective view showing a condition wherein a fueling-error prevention device according to the present invention is built into a filler neck.

Hereinafter, with reference to FIGS. 1 to 17, a typical embodiment of the present invention will be explained. A fueling-error prevention device according to the present embodiment is provided in an inside of a fuel flow path L between a fueling opening H and a fuel tank; blocks the fueling by a fueling nozzle N" having a diameter less than a predetermined diameter when the fueling nozzle N" having the diameter less than the predetermined diameter is inserted in the fuel flow path L; and allows the fueling by a fueling nozzle N' having the predetermined diameter when the fueling nozzle N' having the predetermined diameter is inserted in the fuel flow path L.

Typically, when the fueling nozzle of a fueling gun, which fuels a diesel fuel from the fueling opening H, is inserted, such prevention device opens the later-mentioned flap valve 1, and allows an insertion of the fueling nozzle further than the flap valve 1 to allow a fueling thereof. On the other hand, when there is inserted the fueling nozzle of the fueling gun which fuels a gasoline fuel and has a diameter smaller than that of the fueling nozzle of the fueling gun which fuels the diesel fuel from the fueling opening H, such prevention device maintains a valve-closed state of the later-mentioned flap valve 1, and blocks the insertion of the fueling nozzle further than the flap valve 1 to be incapable of the fueling thereof.

Such prevention device comprises the flap valve 1, first and second sliders 2 and 3, an urging device 4, and a lock member 5. In the present embodiment, the aforementioned members are combined in an approximately cylindrical base 6 whose inner side is one portion of the fuel flow path L. Then, in the present embodiment, by fitting such base 6 in an inside of a filler neck Pa of a filler pipe P structuring the fuel flow path L, the prevention device is provided in the inside of the fuel flow path L.

Such base 6 has an external diameter which can be housed in the inside of the filler neck Pa with a small gap, and also includes a flange 6a on an upper end of a cylinder. Then, such base 6 is entered in the inside of the filler neck Pa from a lower end side thereof up to a position wherein the flange 6a is caught on an upper end of the filler neck Pa, so that engagement claws represented by the reference numeral 6b in the drawings are engaged with latch-engaged portions which are not shown in the drawings on a filler neck Pa side. Accordingly, the base 6 is assembled in such filler neck Pa. The reference numeral 6c in the drawings represents a cap covering an upper surface of the flange 6a.

In an illustrated example, in one portion of side walls 6d of such base 6, there are formed window hole-like portions 6e which are removed from a position just below the flange 6a up to a position of an approximately middle in a cylinder axis direction of the base 6. The window hole-like portions 6e are respectively provided on both sides in a diametrical direction of the base 6. Then, one portion (a front surface portion 20d side of the later-mentioned main body portion 20) of the first slider 2 protrudes to the inside of the fuel flow path L from one of such window hole-like portions 6e, and one portion (a front surface portion 31c side of the later-mentioned main body portion 31) of the second slider 3 protrudes to the inside of the fuel flow path L from the other of such window hole-like portions 6e. The flap valve 1 is rotatably combined in the first slider 2, and in a valve-closed position, the flap valve 1 closes the fuel flow path L by arranging a flap surface 1a in a direction orthogonal to the cylinder axis direction of the base 6. (FIG. 3/the valve-closed position) In a state wherein the fueling nozzle N' having the predetermined diameter is not inserted, the second slider 3 engages with the flap valve 1 which is in the valve-closed position so as to maintain the valve-closed state. On an outer circumferential portion of the base 6, there is formed a guide portion 6f of the later-mentioned linkage arms 32 of the second slider 3. Also, on a lower side of the first slider 2, there is supported the lock member 5 movably up and down inside the window hole-like portions 6e.

The flap valve 1 is positioned in the valve-closed position closing the fuel flow path L by urging so as to block the fueling nozzle from proceeding. In the illustrated example, such flap valve 1 is structured to form an approximately discoid shape having a size closing the fuel flow path L inside the base 6 in the valve-closed position.

The first slider 2 supports the flap valve 1 openably and closably, and also is supported in the base 6 slidably and movably in a direction crossing an axis line x (a center line in a flow direction of a fuel) of the fuel flow path L.

In the illustrated example, such first slider 2 comprises the main body portion 20, and a support portion 21 of the flap valve 1 integrally provided in a lower portion of the main body portion 20. The main body portion 20 comprises a ceiling surface portion 20a, right-and-left side surface portions 20b and 20b, and the front surface portion 20d facing the fuel flow path L. In the right-and-left side surface portions 20b and 20b, there are respectively formed projections 20c which can be housed in a groove 6h (FIG. 11) provided in support walls 6g formed in such a way as to respectively protrude to an outside in both right-and-left side positions clamping the window hole-like portions 6e in the base 6. The first slider 2 slides and moves within a range of the groove 6h. The front surface portion 20d forms an arc shape following an arc of an inner surface of the base 6, and also as heading for a lower side, the front surface portion 20d has a slope gradually hanging over an inner side of the fuel flow path L.

The support portion 21 is structured by a right-and-left pair of side plates 21a and 21a protruding to the lower side from the lower portion of the main body portion 20. In the illustrated example, on a base end of the flap valve 1, there is formed a right-and-left pair of bearing ear portions 1b and 1b, and in a state wherein the bearing ear portions 1b are housed between a pair of the side plates 21a and 21a of the support portion 21, the bearing ear portions 1b corresponding to a pair of such respective side plates 21a and 21a are rotatably assembled in axis holes 1c and 21b formed in the bearing ear portions 1b and the side plates 21a by passing axis pins 1d.

In the illustrated example, a winding portion 1f of a torsion coil spring 1e is held between a pair of the bearing ear portions 1b and 1b of the flap valve 1. Due to the urging of the spring 1e which is held in the aforementioned manner and also whose one end of the spring is caught on a flap valve 1 side and whose the other end of the spring is caught on a back portion 20e side of the first slider 2, the flap valve 1 is positioned in the valve-closed position wherein the flap surface 1a on a base end side thereof is hit against the lower portion of the main body portion 20 of the first slider 2.

The second slider 3 comprises an engaging portion 30 relative to the flap valve 1 which is in the valve-closed position, and also is supported in the base 6 slidably and movably in the direction crossing the axis line x of the fuel flow path L.

In the illustrated example, such second slider 3 comprises the main body portion 31, and the linkage arms 32 whose arm base portions are integrally linked to a lower portion of the main body portion 31, and which protrude in a direction orthogonal to the axis line x of the fuel flow path L. The linkage arms 32 are respectively provided on both right and left sides clamping the main body portion 31. The linkage arms 32 link the arm base portions to a back side of the main body portion 31 to be positioned outside the base 6. The linkage arms 32 protrude to the first slider 2 side in such a way as to clamp the base 6 between a right-and-left pair of the linkage arms 32 and 32, and arm ends are positioned just below the first slider 2. On the outer circumferential portion of the base 6, there is formed the guide portion 6f forming a step-difference form and facing a lower surface of the flange 6a, and the linkage arms 32 of the second slider 3 slide on the guide portion 6f.

The main body portion 31 comprises a ceiling surface portion 31a, right-and-left side surface portions 31b and 31b, and the front surface portion 31c facing the fuel flow path L. The front surface portion 31c forms an arc shape following the arc of the inner surface of the base 6, and also as heading for a lower side, the front surface portion 31c has a slope gradually hanging over the inner side of the fuel flow path L. Also, on the lower side of the front surface portion 31c, there is provided a clamping piece 31d protruding to the inner side of the fuel flow path L by leaving an interval for clamping a free end of the flap valve 1 between the main body portion 31.

The urging device 4 urges the first slider 2 and the second slider 3 in an approaching direction. In the illustrated example, in such urging device 4, one end of the spring is fastened to one of the linkage arms 32 of the second slider 3, and the other end of the spring is fastened to the other of the linkage arms 32 of the second slider 3. Also, the urging device 4 is structured by a coil spring 40 stretched and whose intermediate portion of the spring is pressed against a back portion of the main body portion of the first slider 2.

Figure 3:
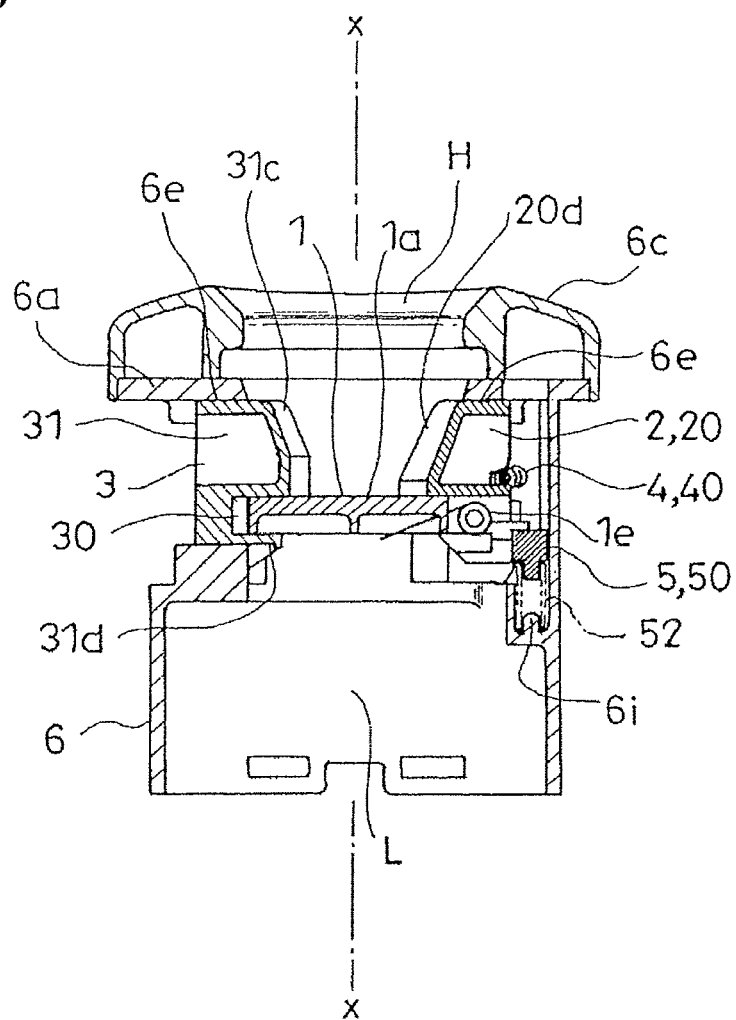
FIG. 3 is a vertical cross-sectional view of the state of FIG. 2.
Figure 4:
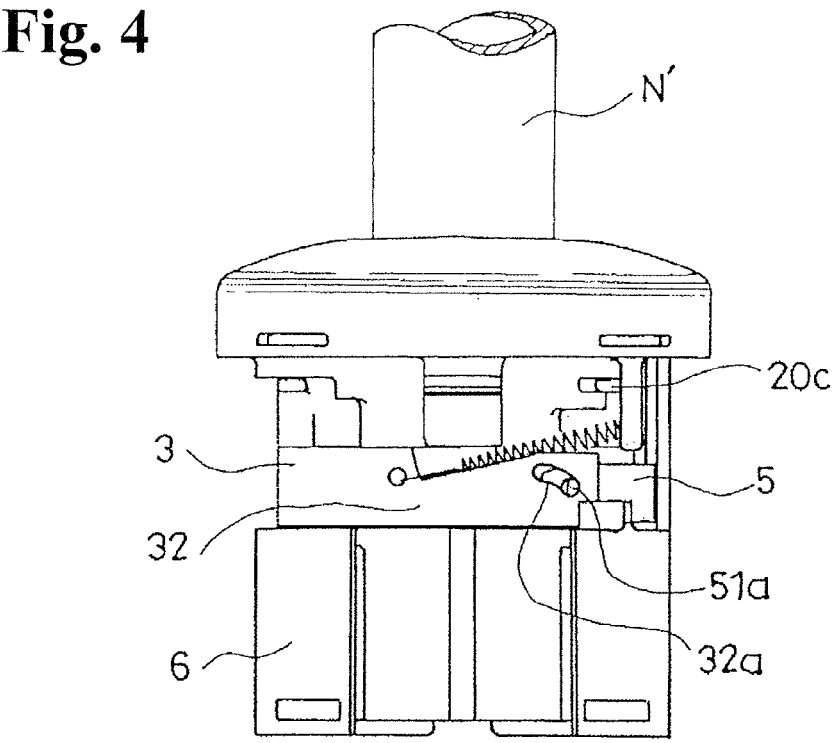
FIG. 4 is a side view of the prevention device in a state wherein the fueling nozzle having a predetermined diameter is inserted, and shows a state just before a flap valve is open.
Figure 5:
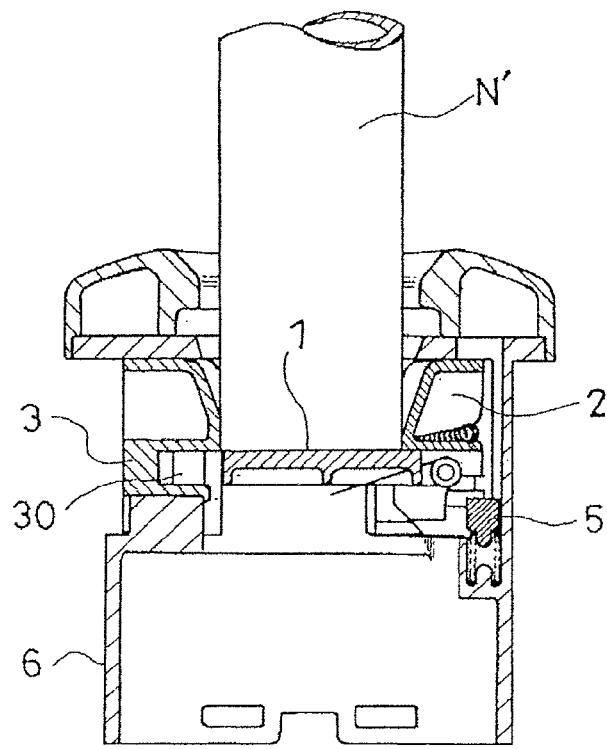
FIG. 5 is a vertical cross-sectional view of the state of FIG. 4.

Due to such spring 40, the first slider 2 and the second slider 3 are positioned in a position wherein a distance between a lower end side of the front surface portion 20d of the main body portion 20 of the first slider 2 and a lower end side of the front surface portion 31c of the main body portion 31 of the second slider 3 is made slightly smaller than an external diameter of the fueling nozzle N' having the predetermined diameter forming a cylinder shape. (FIG. 3)

The lock member 5 blocks a movement in a separating direction of one of either the first slider 2 or the second slider 3 against the urging of the urging device 4. In the illustrated example, such lock member 5 blocks the movement in a direction wherein the first slider 2 is separated from the second slider 3.

Also, such lock member 5 is supported slidably and movably between a lock position blocking the movement in the separating direction of the first slider 2, and a non-lock position, and also is recoiled and urged toward the lock position.

In the illustrated example, such lock member 5 comprises a central portion 50 positioned on the lower side of the first slider 2, and arm portions 51 provided respectively on both right and left sides clamping the central portion 50 in such a way as to protrude toward a side of the second slider 3 from the central portion 50.

The central portion 50 of the lock member 5 is housed in a space formed on the lower side of the main body portion 20 of the first slider 2 to be movable in a direction along the axis line x of the fuel flow path L, i.e., up and down. An upper end of a spring of a compression coil spring 52 whose lower end of the spring contacts with a support portion 6i of the base 6, which is located in a position just below the central portion 50 of the lock member 5 and faces the aforementioned space, is pressed against a lower portion of the central portion 50 of the lock member 5. Due to the spring 52, the lock member 5 is positioned in the lock position.

Figure 14:
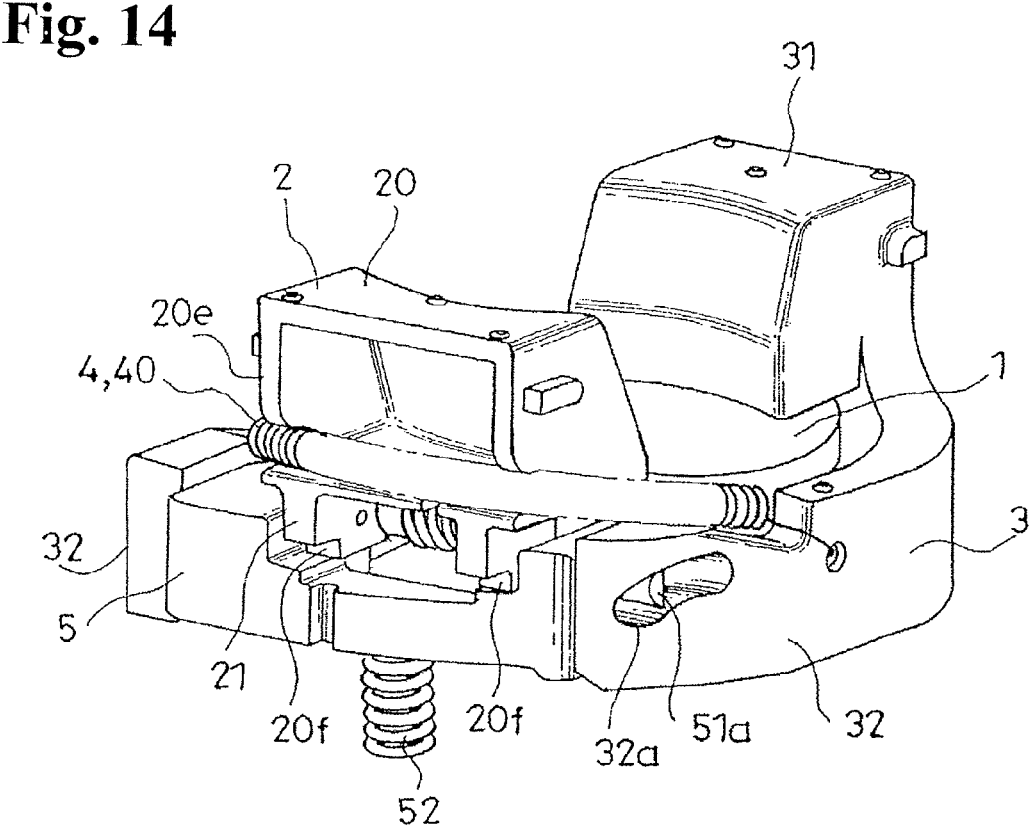
FIG. 14 is a perspective view showing a state wherein the lock member is moved to a non-lock position from the state of FIG. 13.

Specifically, in the illustrated example, abutting portions 50a which become one portion of a front surface portion of the central portion 50 of the lock member 5 which is in the lock position (the position in FIG. 3) abut against abutted portions 20f which become one portion of a back portion 20e of the first slider 2 in the support portion 21 of the flap valve 1 of the first slider 2. (FIG. 13) Then, when the lock member 5 moves to the lower side up to the non-lock position (the position in FIG. 5) due to the movement of the second slider 3 in the separating direction as mentioned later, the central portion 50 of the lock member 5 is entered into the lower side of the support portion 21 of the flap valve 1 of the first slider 2 so as to release the abutment between the abutting portions 50a and the abutted portions 20f. (FIG. 14)

Figure 2:
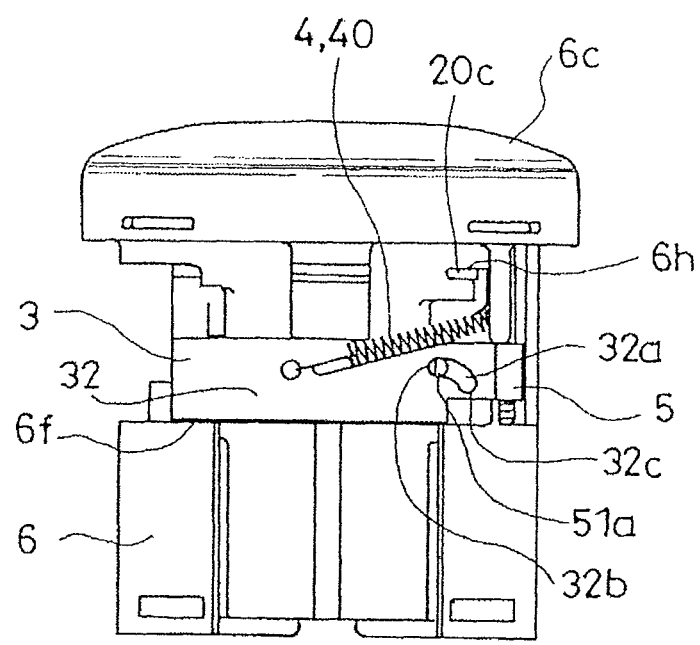
FIG. 2 is a side view of the prevention device in a state wherein a fueling nozzle is not inserted.

Also, arm end sides of the linkage arms 32 of the second slider 3 and the arm portions 51 of the lock member 5 comprise a cam device moving the lock member 5 to the non-lock position by the movement of the second slider 3 in the separating direction. In the illustrated example, such cam device is structured by cam grooves 32a formed on the arm end sides of the linkage arms 32 of the second slider 3, and sliding members 51a formed in the arm portions 51 of the lock member 5. In the illustrated example, one of the right-and-left arm portions 51 and 51 of the lock member 5 is positioned on an inside of one of the right-and-left linkage arms 32 and 32 of the second slider 3, and the sliding member 51a forming a projection formed in an outside of one of the arm portions 51 is housed in the cam groove 32a formed in one of the linkage arms 32. Also, the other of the right-and-left arm portions 51 and 51 of the lock member 5 is positioned on the inside of the other of the right-and-left linkage arms 32 and 32 of the second slider 3, and the sliding member 51a forming the projection formed in the outside of the other of the arm portions 51 is housed in the cam groove 32a formed in the other of the linkage arms 32. The cam groove 32a positions one groove end 32b, which is close to a main body portion 31 side of the second slider 3, on an upper side; extends from there toward the arm end of the linkage arm 32 in such a way as to form an arc shape; and positions the other groove end 32c on a lower side. Then, in a state before the second slider 3 moves in the separating direction, the sliding member 51a is positioned in one groove end 32b of the cam groove 32a. (FIG. 2)

Then, in the prevention device according to the present embodiment, the blocking of the movement of the first slider 2 in the separating direction by the lock member 5 is released by the movement of the second slider 3 moving against the urging of the urging device 4 by abutting against the fueling nozzle N' having the predetermined diameter accompanied by an insertion of the fueling nozzle N' having the predetermined diameter. The aforementioned release allows the movement by the abutment of the fueling nozzle N' of the first slider 2 against the urging of the urging device 4, and the movement of the first slider 2 allows an engagement relative to the flap valve 1 of the second slider 3 to be released.

Figure 6:
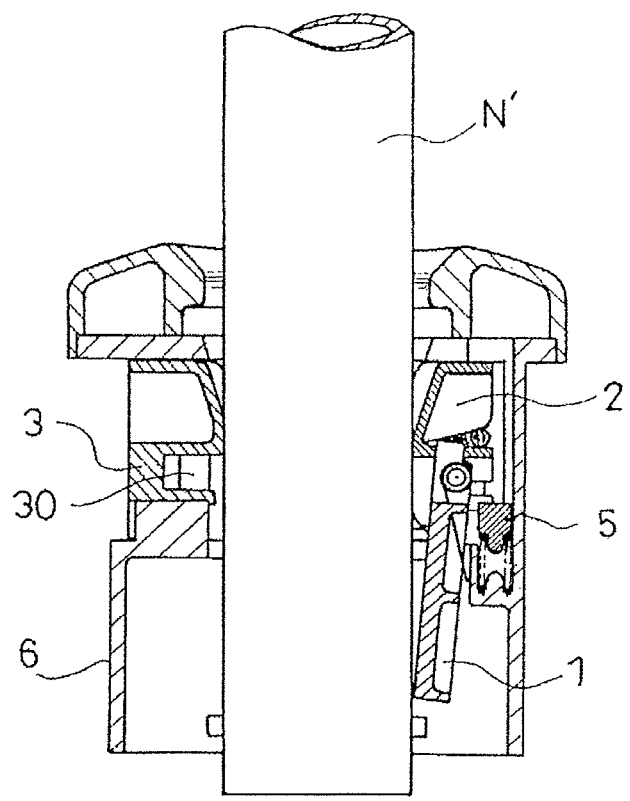
FIG. 6 is a cross-sectional view of the prevention device in the state wherein the fueling nozzle having the predetermined diameter is inserted, and shows a state wherein the flap valve is open.
Figure 7:
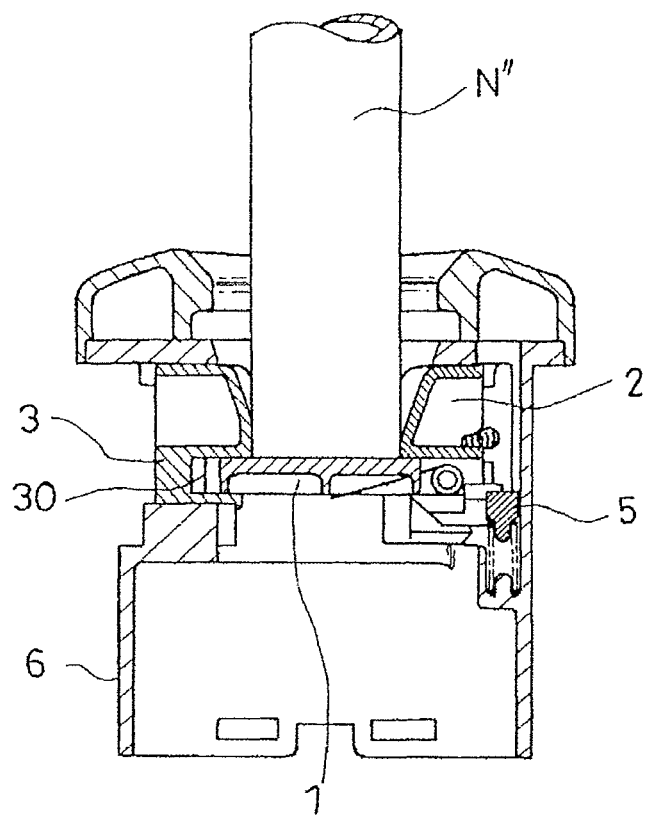
FIG. 7 is a cross-sectional view of the prevention device in a state wherein the fueling nozzle having a diameter less than the predetermined diameter is inserted.
Figure 8:
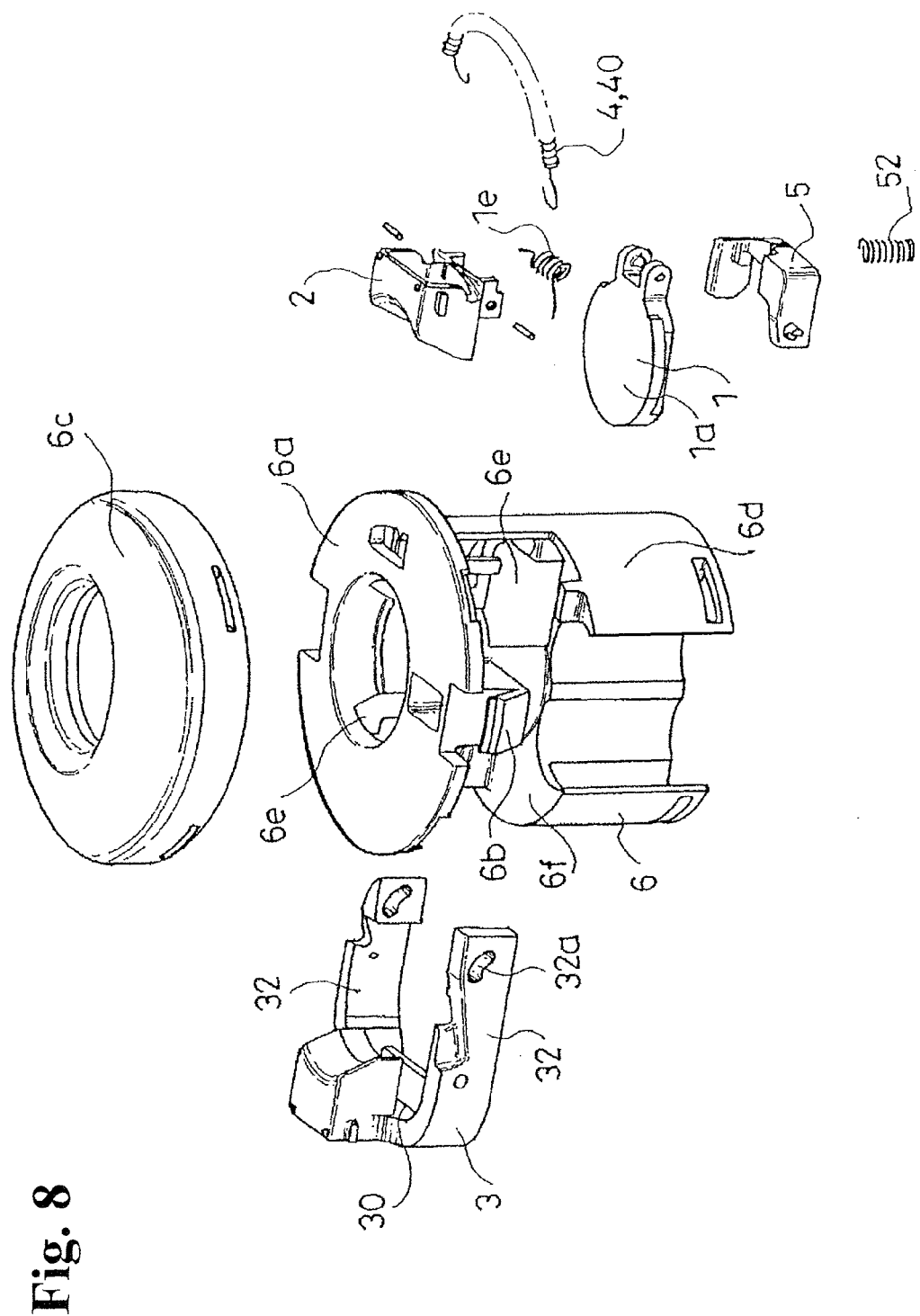
FIG. 8 is an exploded perspective view of the prevention device.
Figure 9:
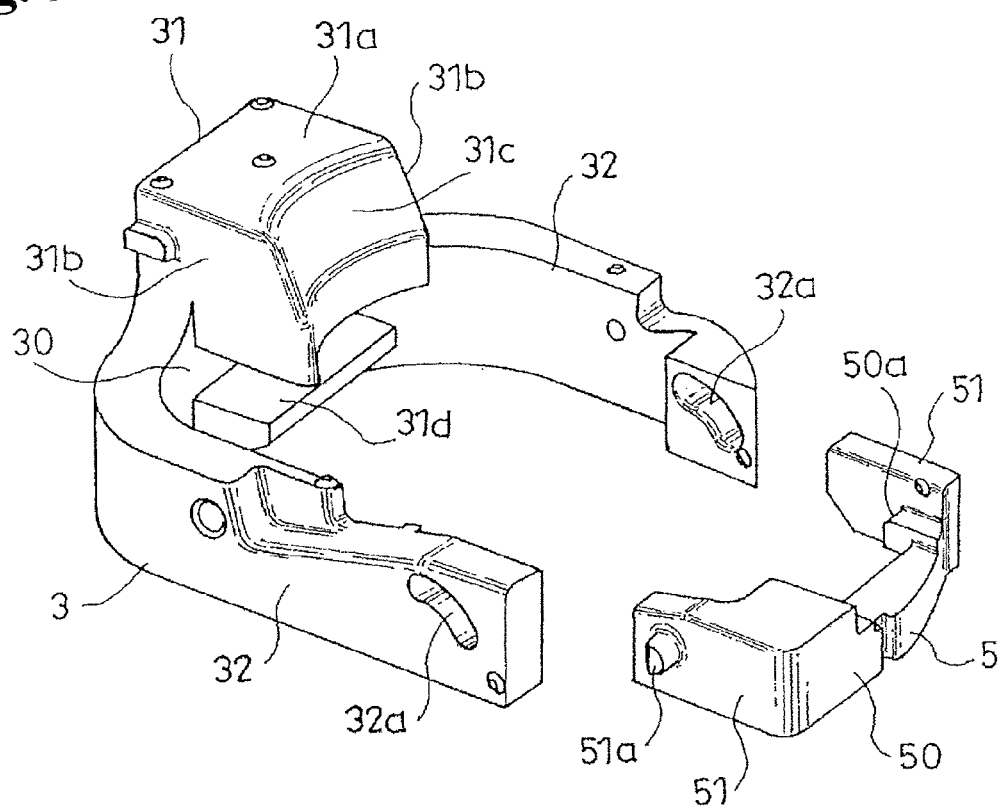
FIG. 9 is a perspective view of a second slider and a lock member.
Figure 10:
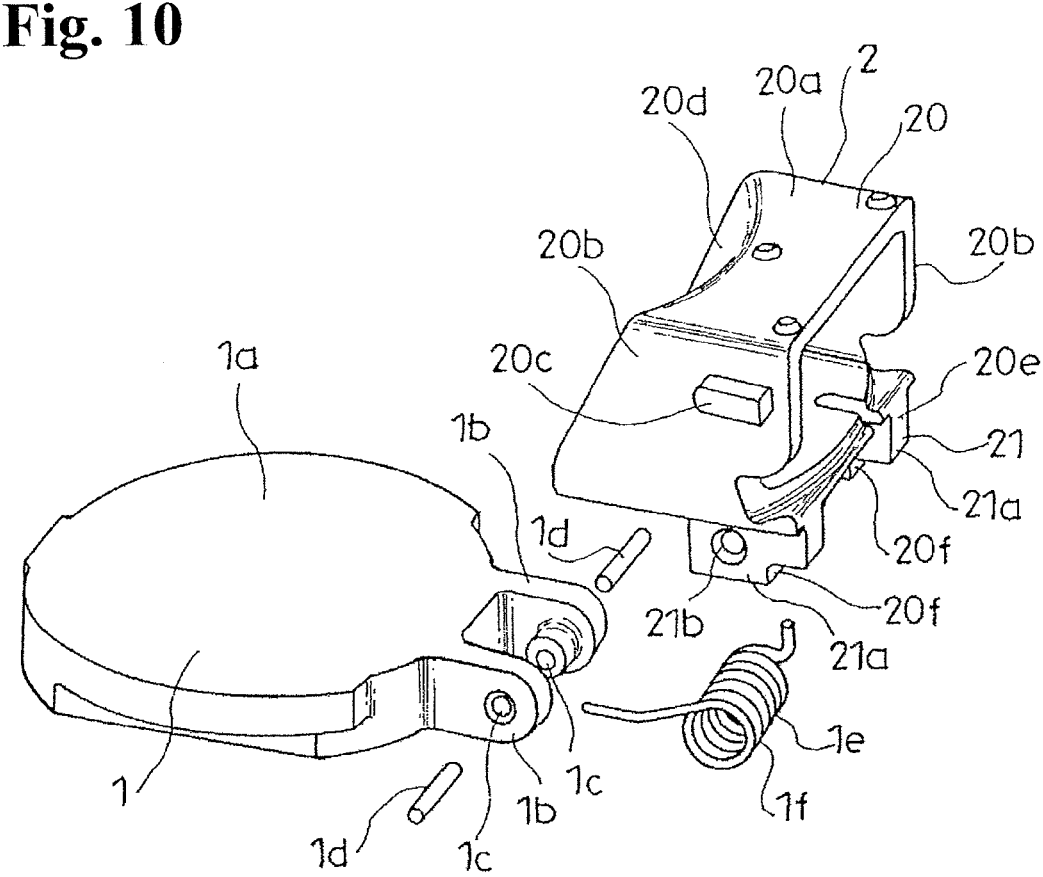
FIG. 10 is a perspective view of a first slider and the flap valve.
Figure 11:
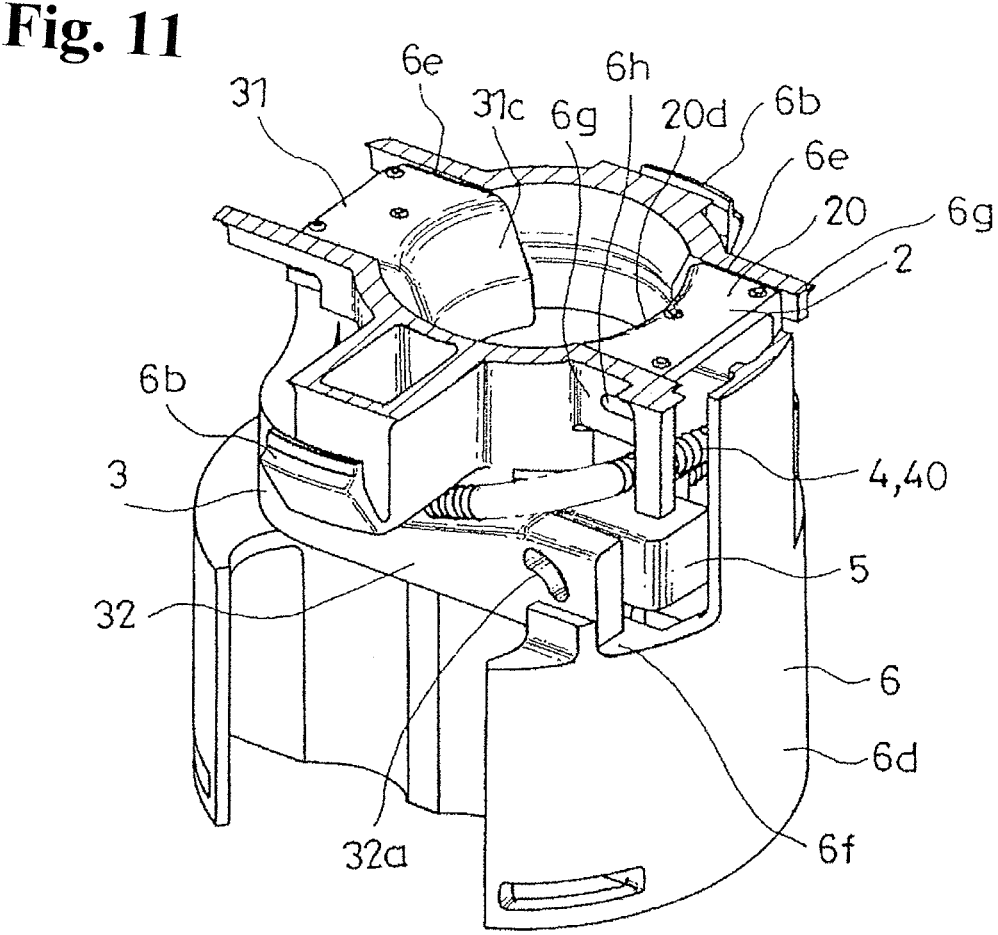
FIG. 11 is a perspective view showing the prevention device by cutting away a flange of a base.
Figure 12:
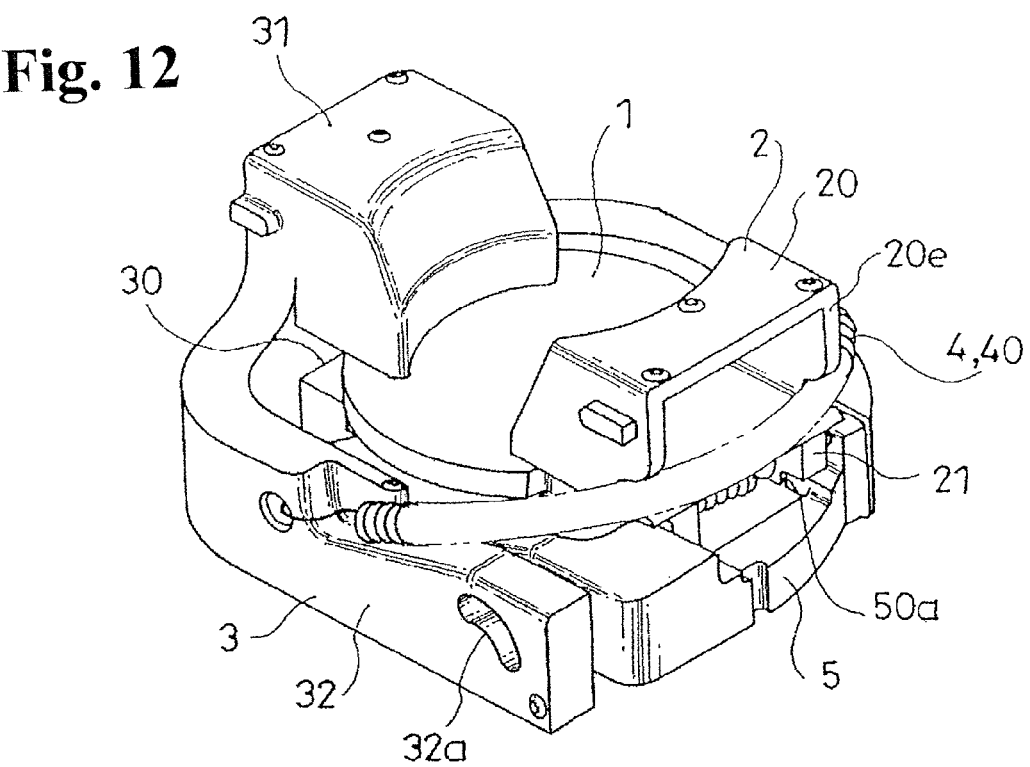
FIG. 12 is a perspective view showing a state wherein the first slider, the second slider, the flap valve, the lock member, and an urging device are combined by omitting the base, and the lock member is in a lock position.
Figure 13:
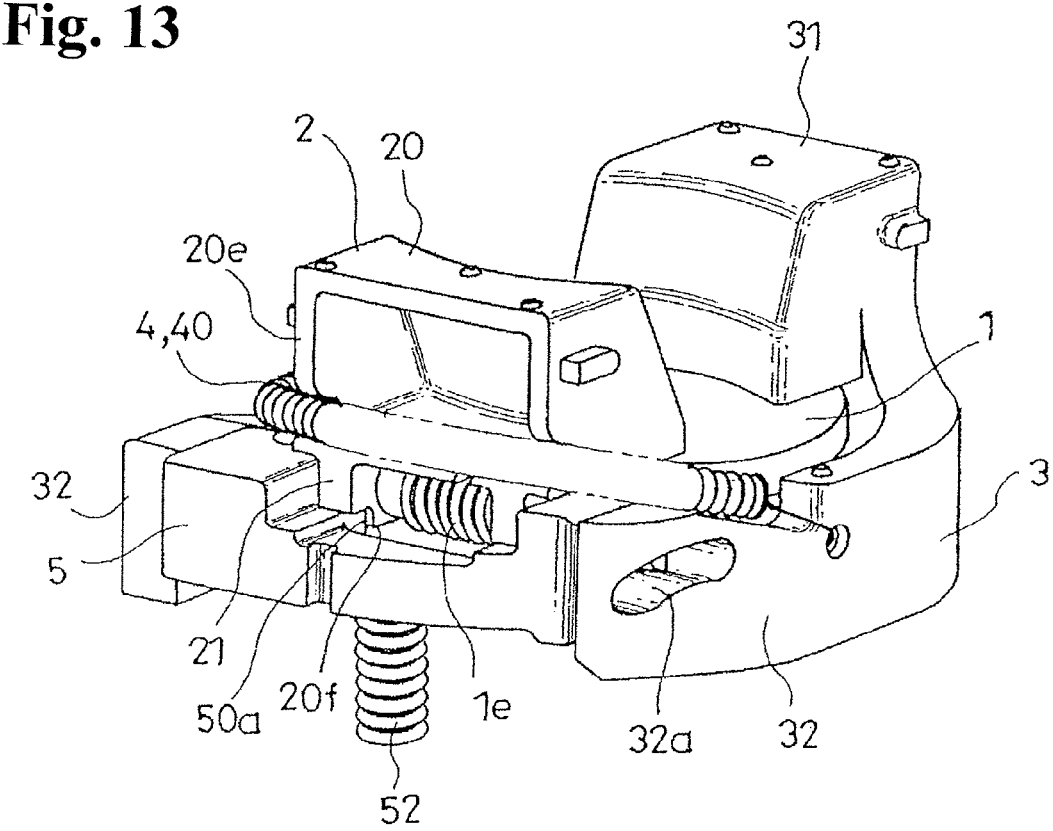
FIG. 13 is a perspective view showing the state of FIG. 12 viewed from a side of the lock member.

Specifically, when the fueling nozzle N' having the predetermined diameter is inserted into the fuel flow path L from the fueling opening H, the fueling nozzle N' abuts against both the front surface portion 20d of the main body portion 20 of the first slider 2 and the front surface portion 31c of the main body portion 31 of the second slider 3. However, due to the lock member 5, the first slider 2 does not move in the separating direction immediately, and first, the second slider 3 moves in the separating direction for a predetermined distance. Even if the second slider 3 moves in that manner, the aforementioned clamping piece 31d of the second slider 3 continues to be caught on the free end of the flap valve 1 from the lower side, so that an engagement between the second slider 3 and the flap valve 1 cannot be released simply by the movement of the second slider 3. On the other hand, when the second slider 3 moves in the separating direction in that manner, the aforementioned sliding members 51a are guided to the other groove end 32c side positioned lower than one groove end 32b from one groove end 32b of the cam grooves 32a, so that (FIG. 4) the lock member 5 moves to the lower side up to the non-lock position against the urging of the spring 52. (FIG. 5) When the lock member 5 moves up to the non-lock position, the abutment of the abutting portions 50a of the lock member 5 relative to the abutted portions 20f structuring one portion of the back portion 20e of the first slider 2 is released, so that the first slider 2 also becomes movable in the separating direction by the fueling nozzle N' so as to carry out such movement of the first slider 2. (FIG. 5) Thereby, the flap valve 1 is pushed by the fueling nozzle N' inserted by releasing a capture of the clamping piece 31d relative to the free end of the flap valve 1, so that the flap valve 1 rotates up to a valve-opened position wherein the free end faces the lower side so as to allow the fueling nozzle N' to proceed further than an installation position of the flap valve 1 and to allow the fueling. (FIG. 6)

After the completion of the fueling, when the fueling nozzle N' is operated to be pulled out of the fuel flow path L, first, due to the urging of the torsion coil spring 1e, the flap valve 1 rotates and returns to the valve-closed position. Next, due to the urging of the urging device 4, the first slider 2 and the second slider 3 are pushed back to a position before the movement in the separating direction, and accompanied by that, the lock member 5 returns to the lock position so as to abut the abutting portions 50a against the abutted portions 20f of the first slider 2 again.

In the prevention device according to the present embodiment, the movement to the valve-opened position of the flap valve 1 closing the fuel flow path L openably is allowed for the first time by the movement of one of the first or the second sliders 2 and 3 which becomes movable as a trigger of the movement of the other of the first or the second sliders 2 and 3. Accordingly, in addition to the movement of the other of the first or the second sliders 2 and 3, as long as a fueling nozzle having a thickness allowing one of the first or the second sliders 2 and 3 to move for the predetermined distance, i.e., the fueling nozzle N' having the predetermined diameter is not inserted into the fuel flow path L, the flap valve 1 never moves to the valve-opened position. For example, even if the fueling nozzle N" which does not reach the predetermined diameter is inserted into the fuel flow path L, and is operated to sway inside the fuel flow path L, only the second slider 3 moves, and the aforementioned engagement with the flap valve 1 by the second slider 3 is never released. (FIG. 7) Thereby, in the prevention device according to the present embodiment, the fueling of non-predetermined types of fuels by the fueling nozzle N" which does not reach the predetermined diameter, i.e., a fueling error, can be reliably prevented.

Incidentally, contrary to the illustrated example, a lock member, which is substantially the same as the aforementioned lock member 5 and is not shown in the drawings, can block the movement of the second slider 3 in the separating direction, and the movement of the lock member, which is not shown in the drawings, to the non-lock position can be also released by interlocking with the movement of the first slider 2 moving against the urging of the urging device 4 by abutting against the fueling nozzle N' having the predetermined diameter accompanied by the insertion of the fueling nozzle N' having the predetermined diameter. In the aforementioned case, such release allows the movement by the abutment of the fueling nozzle N' of the second slider 3 against the urging of the urging device 4, and the movement of the second slider 3 releases the engagement relative to the flap valve 1.

Figure 15:
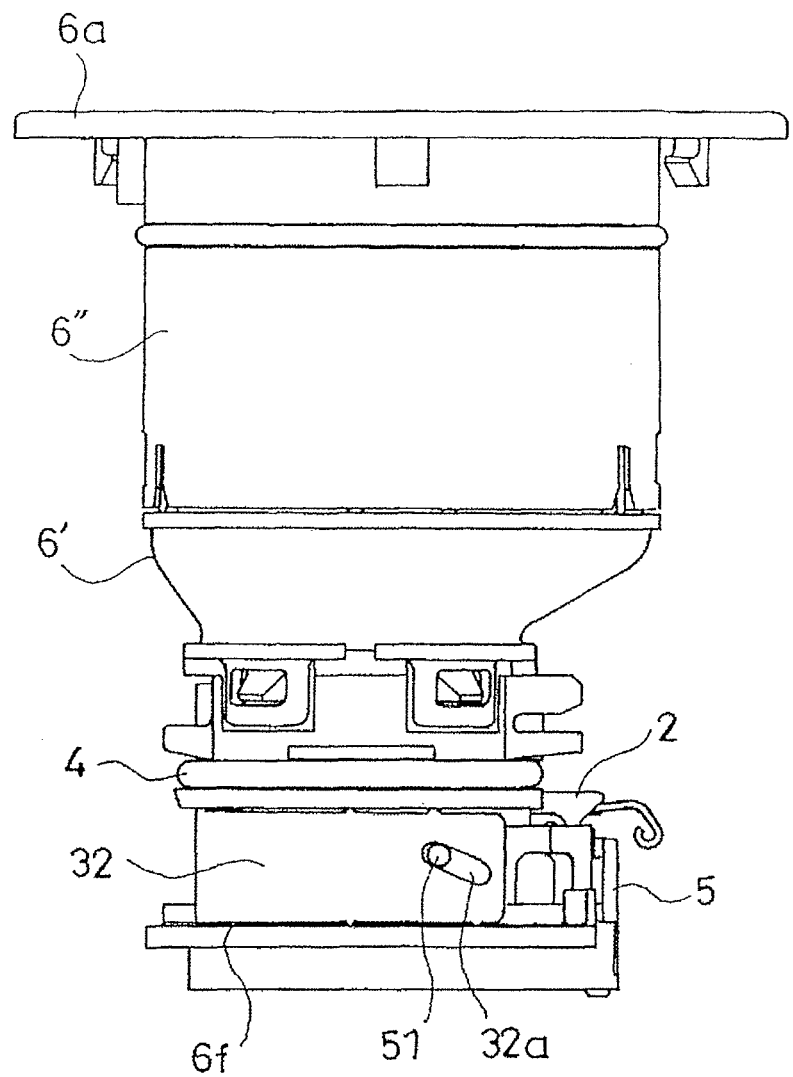
FIG. 15 is a side view showing a modified example of a shape of the prevention device shown in FIGS. 1 to 14.
Figure 16:
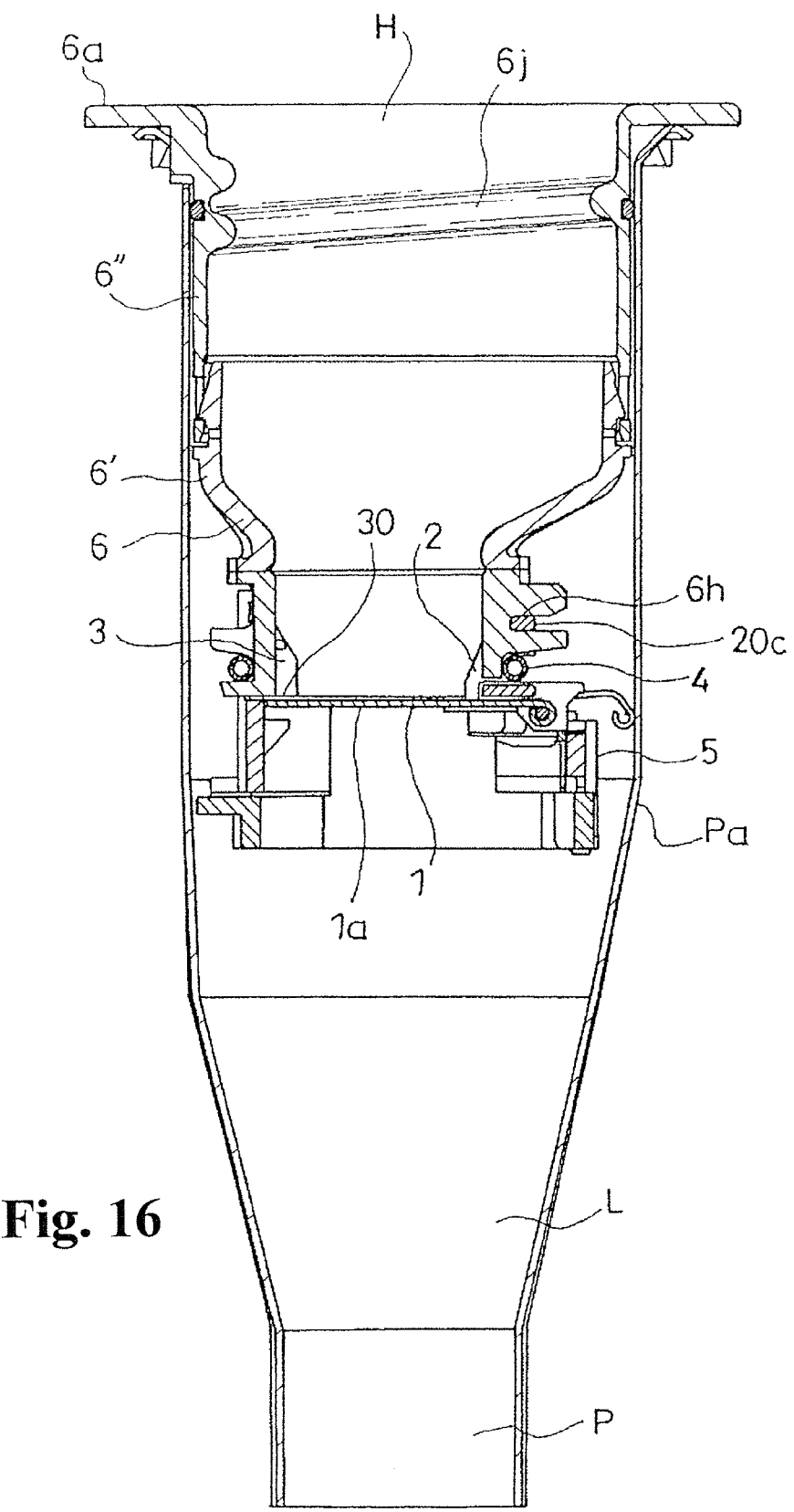
FIG. 16 is a cross-sectional view showing a condition wherein the prevention device shown in FIG. 15 is built into the filler neck.
Figure 17:
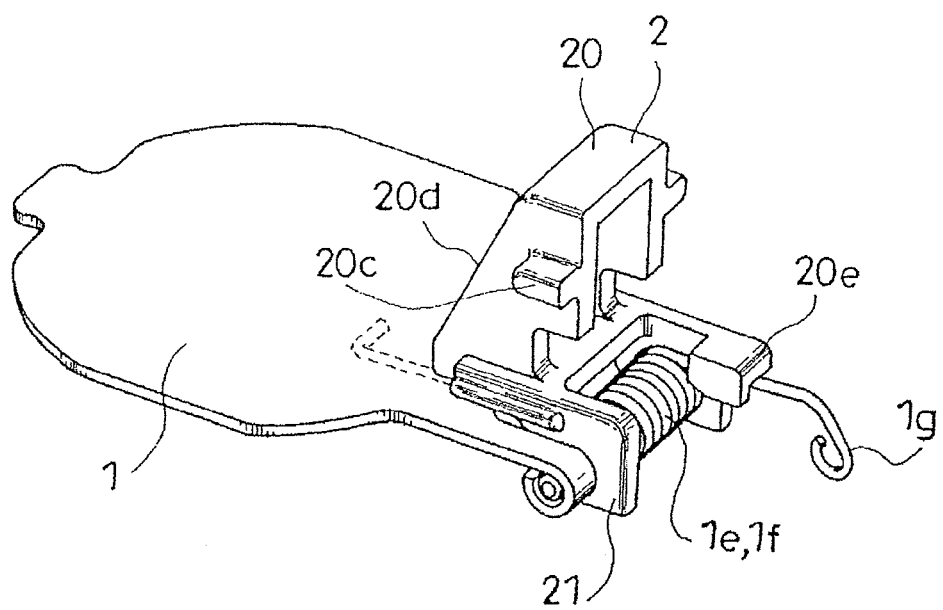
FIG. 17 is a perspective view showing the first slider and the flap valve structuring the prevention device shown in FIG. 15.

FIGS. 15 to 17 comprise the substantially same structure as the fueling-error prevention device shown in FIGS. 1 to 14. However, FIGS. 15 to 17 show another example of the fueling-error prevention device structured by modifying a shape of each structural member of the fueling-error prevention device shown in FIGS. 1 to 14. Therefore, the same symbols used in FIGS. 1 to 14 are assigned to the substantially same parts shown in FIGS. 15 to 17, and explanations regarding the substantially same structures are omitted.

In another example shown in FIGS. 15 to 17, the flap valve 1, the torsion coil spring 1e urging the flap valve, and the filler pipe P are structured by metal having a conductive property. At the same time, another example shown in FIGS. 15 to 17 comprises an extension portion 1g whose the other spring end, caught on the back portion 20e of the first slider 2 in the torsion coil spring 1e from the lower side, extends outwardly from the back portion 20e further, and is always electrically connected to an inner surface of the fuller pipe P. One spring end of the torsion coil spring 1e is pressed against the flap valve 1 from the lower side, and is electrically connected to the flap surface 1a of the flap valve 1. Thereby, in another example shown in FIGS. 15 to 17, when the fueling nozzle is inserted from the fueling opening H, and an end of the fueling nozzle touches the flap valve 1, the fueling nozzle and the filler pipe P are electrically connected through the fueling-error prevention device so as to have earth-connection.

Also, in another example shown in FIGS. 15 to 17, the base 6 is structured by connecting a lower end of an upper-portion cylinder body 6" relative to an upper end of a lower-portion cylinder body 6' wherein the flap valve 1, the first slider 2, the second slider 3, the urging device 4, and the lock member 5 are combined, and the flange 6a is formed in the upper-portion cylinder body 6". Inside the upper-portion cylinder body 6", there is molded a female screw portion 6j wherein a male screw portion of a filler cap which is not shown in the drawings is screwed, and by fitting the fueling-error prevention device in an inside of the filler neck Pa, a screwing structure of the filler cap can be formed on a filler pip P side.

All contents of the specification, claims, drawings, and abstract of Japanese Patent Application No. 2009-263189 filed on Nov. 18, 2009 are cited in their entireties herein and are incorporated as a disclosure of the specification of the present invention.

What is claimed is:

1. A fueling-error preventing device adapted to be provided inside a fuel flow path between a fueling opening and a fuel tank, comprising:
   a flap valve positioned in a valve-closed position for closing the fuel flow path to block a fueling nozzle from proceeding;
   a first slider supporting the flap valve openably and closably, and also supported slidably and movably in a direction crossing an axis line of the fuel flow path, the first slider having an abutted portion;
   a second slider having an engaging portion engaging the flap valve in the valve-closed position, and supported slidably and movably in the direction crossing the axis line of the fuel flow path;
   an urging device urging the first slider and the second slider in an approaching direction; and
   a lock member blocking the first slider from moving in a separating direction against urging of the urging device, said lock member having an abutting portion abutting against the abutted portion of the first slider;
   wherein blocking of a movement of the first slider by the lock member due to abutting of the abutting portion to the abutted portion is released by a movement of the second slider moving against the urging device by inserting the fueling nozzle having a predetermined diameter, and a release allows the first slider to move against the urging device by the abutment of the fueling nozzle, and by movement of the flap valve with the first slider, an engagement of the second slider relative to the flap valve is released,
   the second slider includes a main body portion and two linkage arms extending from the main body portion and facing each other, said engaging portion being disposed under the main body portion, and
   the lock member is disposed under the first slider and includes a central portion, two arm portions extending from the central portion and facing each other, said arm portions slidably engaging the linkage arms, and said abutting portion.

2. A fueling-error preventing device according to claim 1, wherein the linkage arms and the arm portions have either arc-shape cam grooves or sling members engaging the cam grooves to thereby mutually engage the linkage arms and the arm portions so that when the second slider is moved in the direction away from the axis line, the lock member is moved downwardly to permit the first slider to move in a direction away from the axis line.

3. A fueling error preventing device according to claim 2, further comprising a spring urging the lock member upwardly.

4. A fueling-error prevention device according to claim 1, wherein the lock member is supported slidably and movably between a non-lock position and a lock position blocking the movement of the first slider in the separating direction, and the lock member is resiliently urged toward the lock position.

* * * * *